United States Patent [19]
Naumann et al.

[11] Patent Number: 6,074,969
[45] Date of Patent: Jun. 13, 2000

[54] EARTH-ALKALINE ALUMINOBOROSILICATE GLASS FOR LAMP BULBS

[75] Inventors: Karin Naumann, Ober-Olm; Franz Ott, Mitterteich, both of Germany

[73] Assignee: Schott Glas, Mainz, Germany

[21] Appl. No.: 09/178,670

[22] Filed: Oct. 26, 1998

[30] Foreign Application Priority Data

Oct. 27, 1997 [DE] Germany ............ 197 47 354

[51] Int. Cl.⁷ ............ C03C 3/091; C03L 0/095
[52] U.S. Cl. ............ 501/64; 501/66; 501/70
[58] Field of Search .......... 501/64, 66, 70

[56] References Cited

U.S. PATENT DOCUMENTS

| | | | |
|---|---|---|---|
| 3,310,413 | 3/1967 | Harrington | 501/15 |
| 3,496,401 | 2/1970 | Dumbaugh, Jr. | 313/579 |
| 4,060,423 | 11/1977 | Thomas . | |
| 4,163,171 | 7/1979 | Wurster | 313/579 |
| 4,298,388 | 11/1981 | Sack . | |
| 4,394,453 | 7/1983 | Dumbaugh, Jr. | 501/66 |
| 4,409,337 | 10/1983 | Dumbaugh, Jr. | 501/66 |
| 4,441,051 | 4/1984 | Thomas | 313/579 |
| 4,677,081 | 6/1987 | Thomas et al. . | |
| 5,350,972 | 9/1994 | Bucher et al. . | |
| 5,489,558 | 2/1996 | Moffatt et al. | 501/69 |
| 5,508,237 | 4/1996 | Moffatt et al. | 501/69 |
| 5,528,104 | 6/1996 | Marlor et al. . | |
| 5,656,558 | 8/1997 | Brix et al. | 501/70 |
| 5,763,343 | 6/1998 | Brix et al. | 501/67 |
| 5,843,855 | 12/1998 | Suha et al. . | |

FOREIGN PATENT DOCUMENTS

| | | |
|---|---|---|
| 0574158 | 12/1993 | European Pat. Off. . |
| 0638526 | 2/1995 | European Pat. Off. . |
| 0822169 | 2/1998 | European Pat. Off. . |
| 2930249 | 2/1980 | Germany . |
| 3305587 | 9/1983 | Germany . |
| 259099 | 8/1988 | Germany . |
| 51086515 | 7/1976 | Japan . |
| 06016452 | 1/1994 | Japan . |
| 06092677 | 4/1994 | Japan . |
| 07206466 | 8/1995 | Japan . |
| 642265 | 1/1979 | U.S.S.R. . |
| WO 91/07356 | 5/1991 | WIPO . |
| WO 98./55413 | 12/1998 | WIPO . |

OTHER PUBLICATIONS

"Borsilicate Flint Glass, USP Type I", Wheaton Glass products, Inc., April 1993.

"Information sheet for glass tubing", Wheaton Glass Products, March 1995.

"Coloured Glass", Jablonec 1965. (No Month)

"Solarization phenomena in soda–lime–silica glasses containing cerium and arsenic" by K. Bermuth et al, Glastechnische Berichte 58 (1985), pp. 52–58.

*Primary Examiner*—Karl Group
*Attorney, Agent, or Firm*—Walter Ottesen

[57] ABSTRACT

The invention relates to an aluminoborosilicate glass containing alkaline earth metals for lamp bulbs which have molybdenum components and bulb temperatures of at most 650° C. The glass has the following composition (in % by weight, based on oxide): $SiO_2$ 59–61; $Al_2O_3$ 13.5–15.5; $B_2O_3$ 3–5; MgO 2.3–5; CaO 8.2–0.5; BaO 8.5–9.5; $CeO_2$ 0.03–0.3 where (MgO+CaO)/BaO<1.60; CaO/MgO<4.20 and an alkali metal oxide content of <0.08% by weight and a water content of ≦0.02% by weight.

5 Claims, No Drawings

EARTH-ALKALINE ALUMINOBOROSILICATE GLASS FOR LAMP BULBS

FIELD OF THE INVENTION

The invention relates to an earth-alkaline aluminoborosilicate glass for lamp bulbs. The lamp bulbs have molybdenum components and bulb temperatures of approximately 550° C. to 650° C.

BACKGROUND OF THE INVENTION

It is known that glasses for the above-mentioned application must be virtually free of alkali metal oxides, since alkali metal ions interfere with the regenerative halogen cycle of the lamp. This is because, during operation of the lamp, the tungsten vapor from the filament and the halogen/inert gas mixture form an equilibrium between formation and decomposition of tungsten halides. The decomposition reaction takes place at higher temperatures than the formation reaction, so that the tungsten is deposited again on the filament. If this cycle is interfered with by contaminating components, such as for example alkali metal ions, the tungsten is deposited not on the filament but on the inside of the glass bulb, as an undesirable shiny black coating. For this reason, high demands are placed on such glasses with regard to their freedom from alkali metal oxides.

Contaminants which have an adverse effect on the regenerative halogen cycle are not only introduced via the glass but also via the actual manufacturing process by which the lamps are produced. The purity of the electrode material used is therefore also of considerable importance. Purification processes, for example pretreatment of the electrodes by annealing, are too complex and expensive. The same also applies to tempering glass bulbs which have a high alkali metal content.

To be usable as lamp bulb glass for lamp bulbs which contain molybdenum components as supply electrodes, the thermal expansion of the glass has to be adapted to that of molybdenum over the entire temperature range of the lamp, in order to ensure a hermetic seal between glass and supply electrode. The glass must have a higher expansion at its setting temperature (setpoint) compared to molybdenum, that is, the difference in expansion between Mo and the glass must be positive, in order to achieve a radial compressive stress in the glass which is beneficial to the sealing of Mo supply electrodes. The glass should therefore have a coefficient of expansion $\alpha_{20/300}$ of between $4.4 \cdot 10^{-6}$/K and $4.7 \cdot 10^{-6}$/K.

The glass must also have sufficient thermal stability in order not to deform at the bulb temperatures which occur during operation of the lamp.

A further demand placed on a glass which is suitable for use as bulb glass in lamp bulbs is that it be suitable for tube drawing. For this purpose, the glass must be sufficiently crystallization-stable.

The patent literature already describes glasses for such incandescent lamps.

Like the alkali metal ions, water or hydrogen ions also interfere with the halogen cycle.

For this reason, U.S. Pat. No. 4,163,171 also describes an incandescent lamp in which the glass is not only "essentially free of alkali metals", but also may only contain less than 0.03% by weight of water.

German patent publication 3,305,587 describes incandescent lamps made from glass bulbs which have a high BaO content (11–16% by weight). German patent publication 2,930,249 relates to the use of glass compositions which also have a high BaO content (10–23% by weight) as bulb material. In these compositions, moreover, the BaO:CaO weight ratio is between 2.3 and 3.5 (CaO:BaO between 0.28 and 0.43). The glasses described in the latter document are said to have an improved resistance to what is known as "reboil". Reboil is the tendency of the glass to form a large number of small bubbles of included gases when subjected to further processing with a flame or when reheated. This impairs the light transmission and weakens the reheated areas.

A drawback of glasses, which have very high BaO contents, is that they have high melting and working temperatures by comparison with glasses which have high contents of other alkaline-earth metal oxides. High melting points entail a high power consumption, high melting costs and greater corrosion to the tank furnace material.

U.S. Pat. No. 3,496,401 describes incandescent lamps made from an aluminosilicate glass which contain alkaline earth metals and have a maximum alkali metal oxide content of 0.1% by weight, in particular made from glasses containing $SiO_2$, $Al_2O_3$ and 10–25% by weight of alkaline-earth metal oxides, the specific levels of which are not given in more detail. $B_2O_3$ is only an optional component.

U.S. Pat. No. 3,310,413 describes aluminoborosilicate glasses which contain alkaline earth metals for sealing to molybdenum which have defined ratios between the alkaline-earth metal oxides. Thus, with MgO as an optional constituent, the MgO to BaO ratio is limited to less than 0.75 and the ratio of CaO to the sum of MgO and BaO is limited to 0.6 to 2.0.

The glass envelopes for tungsten/halogen lamps described in U.S. Pat. No. 4,394,453 contain large quantities of $Al_2O_3$ (at least 16% by weight), which also leads to a relatively low $SiO_2/Al_2O_3$ ratio.

U.S. Pat. No. 4,409,337 also describes glasses for glass envelopes of tungsten/halogen lamps which have low $SiO_2$ contents relative to the $Al_2O_3$ content, expressed by the $SiO_2/Al_2O_3$ weight ratio which in this case is 3.1–3.7.

U.S. Pat. No. 5,489,568 describes glasses which are suitable in particular for use in flat panel displays. These glasses contain either large quantities of $Al_2O_3$ ($\geq 18\%$ by weight) with relatively low $SiO_2$ contents ($\leq 55\%$ by weight) or little $Al_2O_3$ ($\leq 13\%$ by weight) with relatively high SiO contents ($\geq 55\%$ by weight). The viscosity behavior, which is achieved as a result, is adapted in particular to the technique of drawing flat glass panes and less so to that of tubes for the production of lamps. These glasses are specifically adapted to $\alpha$-silicon and polysilicon and less so to Mo. The same applies to the glasses described in European patent publication 0,672,629 and U.S. Pat. No. 5,508,237.

A commercially available glass for the use described is the glass 8252 produced by Schott Glas and having the composition (% by weight rounded) 60 $SiO_2$; 4.5 $B_2O_3$; 14.5 $Al_2O_3$; 2 MgO; 10 CaO; 9 BaO. Owing to its profile of properties (for example, $\alpha_{20/300}$ $4.6 \cdot 10^{-6}$/K, $T_g$ 720° C.), this glass is eminently suitable as a lamp bulb glass for temperatures of approximately 550° C. to 650° C.

However, it is true both for lamps produced from this glass and for lamps produced from the glasses mentioned previously that the function of the lamps is very easily impaired by contaminants, whether they emanate from the glass or from the electrode material of the lamp mount, as evidenced by the above-described black discoloration on the inside of the glass bulb caused by interference with the halogen cycle. It is therefore imperative that very high demands be placed on the purity, and in particular on the freedom from alkali.

SUMMARY OF THE INVENTION

The object of the invention is therefore to provide a glass wherein, when used as bulb glass, the black discoloration can be prevented at little cost.

This object is achieved by means of the cerium-oxide containing aluminoborosilicate glass which also contains alkaline earth metals.

DESCRIPTION OF THE PREFERRED EMBODIMENTS OF THE INVENTION

The glass contains 59 to 61% by weight of $SiO_2$. At higher contents, the thermal expansion would be too low, while lower contents would cause the coefficient of thermal expansion to assume excessively high levels and would reduce the transformation temperature.

The glass contains 13.5 to 15.5% by weight of $Al_2O_3$. Deviations from this range would also lead to deviations in the desired thermal expansion and hence to defective expansion. In addition, the viscosity parameters would be adversely affected.

The minimum $SiO_2$ content and the maximum $Al_2O_3$ content ensure a relatively high $SiO_2/Al_2O_3$ weight ratio. This has a beneficial effect on the glass formation properties and the bond strength of the glass. A high $SiO_2$ content, specifically in relation to the $Al_2O_3$ content, is able to reduce the reboiling of the glass and can have an advantageous effect on the seal. In a preferred embodiment of the invention, this ratio is to be at least 4.00.

Both $SiO_2$ and $Al_2O_3$ have the effect of raising transformation temperature $T_g$ and working temperature $V_A$, while $B_2O_3$ and the alkaline-earth metal oxides reduce the viscosity.

The glass has a $B_2O_3$ content of from 3 to 5.5% by weight, preferably 3.1 to 5% by weight. Boron oxide advantageously facilitates melting. Higher contents would excessively reduce the transformation temperature $T_g$ of the glass and hence also the stability of the lamp bulb under thermal loads.

The contribution which the individual alkaline-earth metal oxides make to reducing the viscosity and increasing the thermal expansion is different: BaO raises the viscosity more than MgO. The effect of CaO lies between the two. By contrast, CaO increases the thermal expansion to a greater extent than MgO and BaO.

The glass therefore contains specific quantities of the alkaline-earth metal oxides and a specific ratio between these components.

The BaO content in the glass is 8.5 to 9.5% by weight, and the CaO content in the glass is 8.2 to 10.5% by weight. Furthermore, the glass contains 2.3 to 5% by weight of MgO.

The weight ratio between the sum of CaO and MgO, on the one hand, and BaO, on the other hand, ((CaO+MgO)/BaO) should be less than 1.60.

The CaO to MgO weight ratio is also important and should be less than 4.20.

Surprisingly, it has now been discovered that adding cerium oxide to the glasses of the above-mentioned composition range reduces the black discoloration to lamps produced from these glasses. The glass according to the invention therefore contains 0.03 to 0.3% by weight of $CeO_2$. Within this concentration range, cerium oxide does not have any adverse effect on the physical properties which are required for lamp glasses. Higher contents would lead to an interfering yellow discoloration to the glass, since $CeO_2$ shifts the UV edge of the glass towards greater wavelengths. Furthermore, $CeO_2$ is also a good refining agent, for which reason there is no need for further refining agents, yet a satisfactory bubble-free glass quality is achieved. Owing to the good refining action of the cerium oxide, the reboil temperature of the glass also increases. This is the temperature at which a glass specimen which on visual inspection at room temperature is bubble-free suddenly reveals the formation of bubbles at the interface with a metal (sample holder, Mo) when the temperature is increased. Therefore, when fused to Mo, the glass according to the invention has less tendency to reboil than poorly refined glasses.

The requirements relating to a very low content of alkali metal oxides and other impurities, both in the glass and in the electrode material, are generally higher the higher the operating temperatures of the lamp. Surprisingly, it has now been found that in the glasses according to the invention, which, owing to their stability to thermal loads, are suitable for use as bulb material for lamp bulbs having bulb temperatures of at most approximately 650° C., alkali metal oxide contents of up to <0.08% by weight are permissible. To illustrate the fact that greater quantities of impurities are tolerated without interfering with the sensitive system and causing black discoloration to the bulb, reference is made to the examples given below.

The fact that in the glass according to the invention alkali metal oxide contents of 0.03% by weight and more, namely up to <0.08% by weight, are tolerable, means that production of the glass and of the lamp is simplified and made less expensive, since this higher limit value does not require all the oxide component raw materials to have an extremely low alkali metal content.

As has already been mentioned above, the water content in the glass is also important. This should remain limited to at most 0.02% by weight. By suitably selecting the raw materials and the melting conditions, it is also possible to keep the water content at a suitably low level. For example, it can be reduced by using aluminum oxide instead of aluminum hydroxide.

The glasses according to the invention, which have coefficients of thermal expansion $\alpha_{20/300}$ of between $4.4 \cdot 10^{-6}$/K and $4.7 \cdot 10^{-6}$/K and transformation temperatures $T_g$ of more than 710° C., also exhibit sufficient stability under thermal loads in the lamp test (see below) and reveal themselves to be suitable for use as bulb material for lamp bulbs having bulb temperatures of at most approximately 650° C. Their resistance to reboiling is documented by reboil temperatures of at least 1430° C.

EXAMPLES

To produce the glasses of the examples, the raw materials used for the particular oxide components were silica sand, boric acid, aluminum oxide, dolomite, calcium/barium carbonate and cerium oxide, with the barium carbonate having a low alkali metal content while the other raw materials had the level of purity which is standard for industrial glasses. For Example V2 (see Table 1), all the raw materials used had a low alkali metal content. The batch, which had been well homogenized, was melted at 1550–1600° C., refined and homogenized. Tubes were then drawn. The tubes exhibited a very good quality of glass and high dimensional accuracy and were free of interfering crystals.

Table 1 shows two examples of glasses according to the invention (A) and three comparative examples (V) with their compositions (in % by weight based on oxide) and their essential properties.

In addition to the coefficient of thermal expansion $\alpha_{20/300}$, the transformation temperature ($T_g$), the temperature for a viscosity of $10^{13}$ dPas (AP), the temperature for a viscosity of $10^{7.6}$ dpas (Ew) and the temperature for a viscosity of $10^4$ dPas ($V_A$), the reboil temperature is also given. The higher this reboil temperature lies, the less tendency the glass exhibits to form bubbles when sealed to Mo.

For a lamp test, the tubes were used to produce halogen lamps in the usual way (up to 45 lamps per example). Electrode material of different purity levels was used (expressed in Table 1 as "pure" or "impure"). The lamps were operated at a bulb temperature of approximately 640° C. In the case of Example V2 and V3 (see Table 1), on the one hand the impure electrode material (1)) was annealed (see 2a)), while, on the other hand, instead, the glass bulb was tempered (see 2b)). These two complex process steps are not suitable for economic production. For examples in which blackening occurred on the inside of the glass bulb in the lamp test, qualitative, visually determined "blackening levels" and the number (in %) of lamps which exhibited the blackening in question are indicated in Table 1. In this respect, 0 means no blackening, 1 means slight blackening, 2 means moderate blackening and 3 means considerable blackening.

For Example A1, the maximum crystal growth rate $CG_{max}$ and the upper devitrification temperature UDT (liquidus temperature) were determined. The results $CG_{max}=0.11$ $\mu$m/min and UDT=1180° C. (58 K at $V_A$) document the satisfactory stability to crystallization of the glasses according to the invention.

The examples make clear that the addition of cerium to the glass allows the lamp to tolerate greater quantities of impurities than lamps produced using glasses with no cerium oxide content. The impurities are both in the glass (alkali metal oxides) and in the electrode material, that is, the lamp nevertheless continues to exhibit satisfactory results in the lamp test.

As a result of this reduction in demands placed on the purity of the glass raw materials and of the electrode material and of the production conditions, the production of lamps using the glass according to the invention is made more simple and more economical.

It is understood that the foregoing description is that of the preferred embodiments of the invention and that various changes and modifications may be made thereto without departing from the spirit and scope of the invention as defined in the appended claims.

TABLE 1

Exemplary embodiments (A) and comparative examples (V): Compositions of the glasses (in % by weight) and their essential properties

|  | V1 | V2 | A1 | A2 | V3 |
|---|---|---|---|---|---|
| $SiO_2$ | 59.1 | 59.1 | 59.1 | 59.8 | 56.3 |
| $Al_2O_3$ | 14.5 | 14.5 | 14.5 | 14.5 | 15.7 |
| $B_2O_3$ | 4.85 | 4.85 | 4.85 | 3.5 | 4.65 |
| MgO | 2.5 | 2.5 | 2.5 | 5.0 | 5.6 |
| CaO | 10.3 | 10.3 | 10.3 | 8.4 | 8.3 |
| BaO | 8.85 | 8.75 | 8.75 | 8.8 | 8.1 |
| $CeO_2$ | — | — | 0.3 | 0.03 | — |
| $Sb_2O_3$ | 0.17 | 0.1 | — | — | — |
| $Na_2O$ | 0.11 | 0.02 | 0.06 | 0.065 | 0.03 |
| $K_2O$ | 0.02 | 0.01 | 0.01 | 0.006 | 0.02 |
| $H_2O$ (% by weight) | 0.016 | 0.020 | 0.019 | 0.011 | 0.017 |
| $\alpha_{20/300}$ ($10^{-6}$/K) | 4.58 | 4.55 | 4.54 | 4.59 | 4.45 |
| $T_g$ (° C.) | 719 | 715 | 714 | 725 | 714 |
| AP (° C.) | 725 | 725 | 725 | n.d. | 726 |
| Ew (° C.) | 940 | 940 | 940 | n.d. | n.d. |
| $V_A$ (° C.) | 1237 | 1236 | 1238 | 1244 | 1180 |
| Reboil temp. (° C.) | n.d. | 1465 | 1482 | 1470 | 1430 |
| Electrode material | pure | 1) impure 2a) annealed 2b) glass tempered | Impure | | 1) impure 2a) annealed 2b) glass tempered |
| "Lamp test" | blackening | 1) blackening 2a) no blackening 2b) no blackening | No blackening | No blackening | 1) blackening 2a) no blackening 2b) no blackening |
| Degree of blackening: % | n.d. | 1) 0:7; 1:8; 2:18; 3:66 | — | | 1) 0:37; 1:23; 2:17; 3:23 | n.d. = not determined

What is claimed is:

1. An aluminoborosilicate glass containing alkaline earth metals for lamp bulbs which have molybdenum components and with bulb temperatures of at most 650° C., said glass comprising in percent by weight on oxide basis:

| $SiO_2$ | 59–61 |
|---|---|
| $Al_2O_3$ | 13.5–15.5 |
| $B_2O_3$ | 3–5.5 |

-continued

| | |
|---|---|
| MgO | 2.3–5 |
| CaO | 8.2–10.5 |
| BaO | 8.5–9.5 |
| CeO$_2$ | 0.03–0.3 |
| where | |
| (MgO + CaO)/BaO | <1.60 |
| CaO/MgO | <4.20 | and an alkali metal oxide content of <0.08% by weight and a water content of ≦0.02% by weight.

2. The aluminoborosilicate glass of claim 1, wherein said glass contains between 3.1 and 5% by weight of $B_2O_3$.

3. The aluminoborosilicate glass of claim 1, wherein the $SiO_2/Al_2O_3$ weight ratio is ≧4.00.

4. The aluminoborosilicate glass of claim 1, wherein said glass has a coefficient of thermal expansion $\alpha_{20/300}$ of between $4.4\cdot10^{-6}$/K and $4.7\cdot10^{-6}$/K, a transformation temperature $T_g$ of greater than 710° C. and a reboil temperature of at least 1430° C.

5. The aluminoborosilicate glass of claim 1, wherein said glass withstanding temperatures of approximately 550° C. to 650° C. when used as a bulb material for lamp bulbs.

* * * * *

UNITED STATES PATENT AND TRADEMARK OFFICE
CERTIFICATE OF CORRECTION

PATENT NO. : 6,074,969
DATED : June 13, 2000
INVENTOR(S) : Karin Naumann and Franz Ott It is certified that error appears in the above-identified patent and that said Letters Patent is hereby corrected as shown below:

In column 2, line 47: delete "SiO" and substitute -- $SiO_2$ -- therefor.

In column 2, line 47: between "contents" and "($\geq 55\%$", insert -- ($\leq 55\%$ by weight) or little $Al_2O_3$ ($\leq 13\%$ by weight) with relatively high $SiO_2$ contents -- therefor.

In column 5, line 8: delete "dpas" and substitute -- dPas -- therefor.

Signed and Sealed this

Eighth Day of May, 2001

Attest:

NICHOLAS P. GODICI

Attesting Officer    Acting Director of the United States Patent and Trademark Office